United States Patent [19]

De Weerd

[11] Patent Number: 4,754,386
[45] Date of Patent: Jun. 28, 1988

[54] D.C. VOLTAGE CONVERTER WITH OVERLOAD PROTECTION

[75] Inventor: Jan De Weerd, Hilversum, Netherlands

[73] Assignees: American Telephone and Telegraph Company-AT&T Bell Laboratories, Murray Hill, N.J.; Philips Telecommunications BV, Hilversum, Netherlands

[21] Appl. No.: 53,228

[22] Filed: May 22, 1987

[30] Foreign Application Priority Data

May 30, 1986 [NL] Netherlands ........................ 8601395

[51] Int. Cl.⁴ .......................................... H02M 3/335
[52] U.S. Cl. ....................................... 363/21; 363/49; 363/56; 323/901
[58] Field of Search .................................. 363/18–21, 363/49, 56, 97, 131; 323/901

[56] References Cited

U.S. PATENT DOCUMENTS 4,156,273  5/1979  Sato ................................... 363/21 X
4,246,634  1/1981  Purol .................................... 363/49
4,561,047 12/1985  DePuy ............................. 363/21 X Primary Examiner—Peter S. Wong
Attorney, Agent, or Firm—Lucian C. Canepa

[57] ABSTRACT

In a d.c. voltage converter 1 including a series arrangement of a transformer 3 and a pulse-switched current source 7 the power converted by means of the transformer 3 is kept constant with the aid of a control circuit 13. In the event of a short-circuit in one of the secondary windings 5-1, 5-2 a voltage drop across an auxiliary winding 6 of the transformer 3 is used to limit the converted power during the short-circuit.

3 Claims, 1 Drawing Sheet

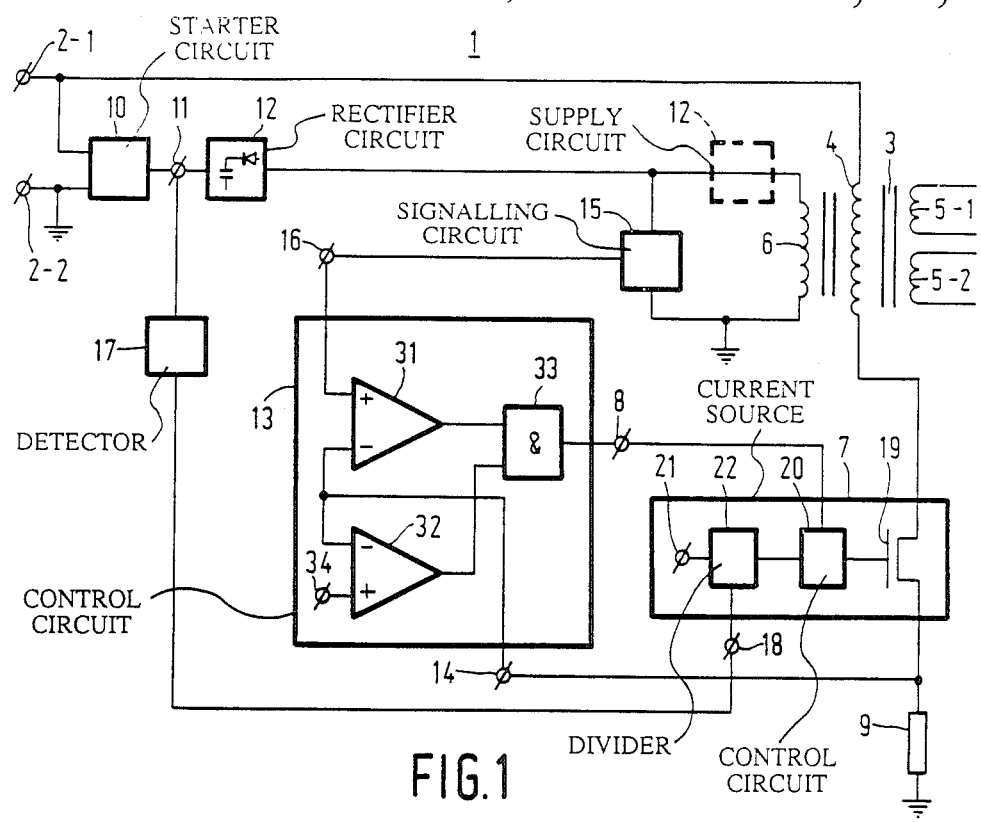
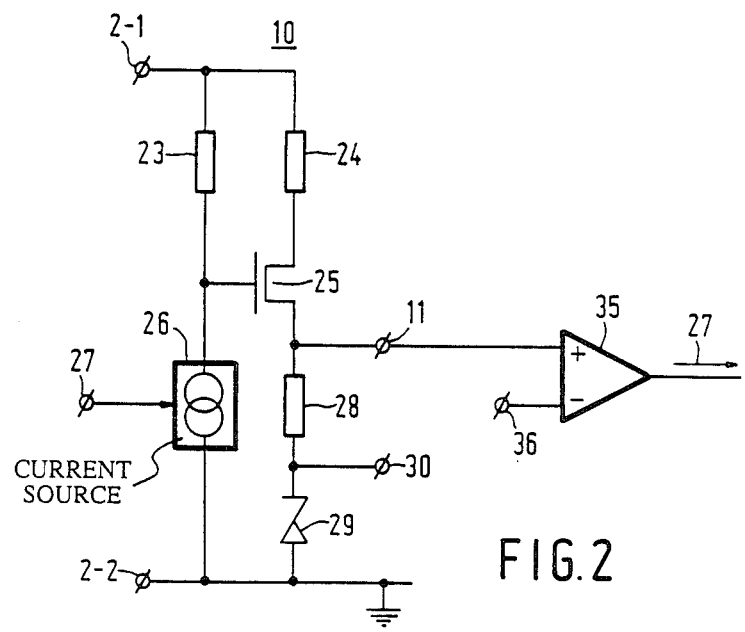

D.C. VOLTAGE CONVERTER WITH OVERLOAD PROTECTION

The invention relates to a d.c. voltage converter having a line input, the converter comprising a transformer having a primary winding, at least one secondary winding and an auxiliary winding, a two-branch parallel circuit connected to the line input, one branch comprising a starter circuit having a supply voltage output and the other branch comprising a series arrangement which includes at least the primary winding and a pulse-switched current source having a control input, a rectifier circuit connected to the auxiliary winding, which is connected to the supply voltage output of the starter circuit and a control circuit connected to the control input of the current source and having a detection signal input coupled to the series arrangement for detecting the magnitude of the current flowing through the series arrangement.

Such a d.c. voltage converter is disclosed in U.S. Pat. No. 4,246,634. Converters of this type are used in the conversion of a d.c. voltage signal into one or more supply voltages for electronic circuits. In, for example, public telephony a plurality of supply voltages are generated from the d.c. voltage signal incoming via the line input, for what are commonly referred to as "network terminations" provided at the subscriber's side. An important requirement to be satisfied by the converter is that for generating the supply voltage it dissipates itself little power and withdraws a limited amount of power from the line. In the known converter, the starter circuit is connected to the line input which during starting of the converter generates a supply voltage at the supply voltage output for use in the converter. The converter is started by the supply voltage whereafter a rectifier circuit connected to the auxiliary winding of the transformer takes over the generation of the supply voltage of the starter circuit. This take-over action, known as bootstrap, limits the power dissipation of the converter.

The converter disclosed in the aforecited U.S. Patent includes a power control circuit having control circuit connected to the auxiliary winding of the transformer which has for its object to keep the voltage and current generated in the secondary winding of the transformer constant.

The converter has the disadvantage that the secondary voltage and current are also kept constant when at the secondary side of the transformer an overload occurs, for example owing to a short circuit in one of the lines connected to the secondary windings.

The invention has for its object to limit in a simple way its own dissipation and the power withdrawn by the converter at the line input, more specifically during an overload condition or a short-circuit.

According to the invention, a first embodiment of the d.c. voltage converter is therefore characterized, in that the control circuit has an additional control input coupled to the auxiliary winding for reducing by means of the control circuit the maximum drive of the pulse-switched current source in dependence on the voltage across the auxiliary winding.

Advantageously, the auxiliary winding already presented for the "bootstrap" offers the possibility of providing signalling in a simple way for reporting the occurrence of an overload or short-circuit at the secondary side of the transformer. Since the additional control input is directly coupled to the auxiliary winding of the transformer, this signalling can moreover be effected rapidly without any disadvantageous delay and be realised in a manner in which the electric isolation between the primary and auxiliary windings on the one hand and the secondary winding of the transformer on the other hand is maintained.

According to the invention, a second embodiment of the d.c. voltage converter is characterized, in that the converter includes a detector coupled to the supply voltage output of the starter circuit and that the current source has an inhibit signal input connected to the detector for only keeping the current source in the switched-on state by means of a signalling signal to be produced by the detector as long as the amplitude value of the supply voltage on the supply voltage output exceeds a minimal value.

The detector does not permit switching of the current source until the amplitude value of the supply voltage exceeds a minimal value. This accomplishes that the value of the supply voltage and consequently the value of the voltages derived in the converter from the supply voltage are well-defined and consequently reliable such that a stable and appropriately controllable converter is realized.

In addition, the detector contributes to limiting in a reliable manner during an overload the withdrawal of power by means of the converter at the line input and consequently at the same time to limiting the internal dissipation of the converter. Namely, in the case in which during an overload situation the drive limitation of the current source does not function adequately, the detector completely switches off the current source at the occurence of an internal overload at the supply voltage output, which results in a very reliable functioning of the converter.

A third embodiment of the d.c. voltage converter according to the invention is characterized, in that the starter circuit includes two parallel-arranged series circuit arrangements, a first circuit of which comprises a first resistor and the main current path of a second transistor and the second arrangement comprises, arranged one after the other, at least a second resistor, the main current path of a first transistor and a third resistor, the base of the first transistor being connected to the junction between the first resistor and the second transistor and the junction between the main current path of the first transistor and the third resistor constituting the supply voltage output, which is coupled to the base of the second transistor for switching the starter circuit off in dependence on the value of the voltage across the auxiliary winding.

The converter including the starter circuit has the advantage that after starting of the converter it does substantially not withdraw any power from the line input and particularly does not do so if the first resistor is chosen to have a very high impedance (of the order of 10 MΩ). An additional advantage is that the starter circuit does not include a capacitor. As a result thereof the converter is not only compact but furthermore it can be integrated very satisfactorily on an IC which reduces the cost price.

The invention and its advantages will now be further described by way of example with reference to the accompanying drawings. Therein:

FIG. 1 shows a preferred embodiment of the d.c. voltage converter according to the invention;

FIG. 2 shows an embodiment of a starter circuit for use in the converter of FIG. 1.

The d.c. voltage converter as shown in FIG. 1 is used more specifically in public telephony. Herein, a d.c. voltage signal is put, in a telephone exchange, on a line whose line input 2-1, 2-2, provided at the subscriber's end is shown in FIG. 1. The resistance of the line, varying from approximately 0 to 1400 Ohm, is decisive for the signal value on the line input 2-1, 2-2 and is in the order of 20 to 96 volts. This signal is converted by the converter 1 into the supply voltages which are used, for example, in an ISDN (Integrated Services Digital Network) system for supplying equipment installed at the subscriber's side. This equipment includes, for example, terminal stations for telephony, text, facsimile, data and video, and includes the interfaces for controlling these end stations.

The converter 1 comprises a transformer 3, having a primary winding 4, secondary windings 5-1, 5-2 and an auxiliary winding 6. Via rectifier and smoothing circuits, not shown, said supply voltages can be withdrawn at the secondary windings 5-1, 5-2. These supply voltages are both electrically isolated from each other and from the d.c. voltage signal at the line input 2-1, 2-2. In addition, the converter 1 includes a series arrangement, connected to the line input 2-1, 2-2, of the primary winding 4, a pulse-switched current source 7 having a current control input 8, and, for example, a resistor 9.

The current source 7 includes a transistor, for example an FET 19, whose gate is connected to a gate control circuit 20 to which the control input 8 is connected. The gate control circuit 20 is arranged for controlling the current to the FET 19, such, in dependence on a control signal at input 8, that this current is given a substantially sawtooth-shaped variation. The control signal can, for example, constitute a frequency-modulated signal for controlling the current through the FET 19 in dependence on the frequency modulation. Or the current control signal constitutes a pulse width modulated signal or a pulse-shaped signal, for example a pulse-position signal for controlling the current through the FET 19 in dependence on an amplitude change-of-state of pulses in the signal. In the sequel of this description it will always be assumed that the current control signal for switching the current source 7 is a pulse-shaped signal. The advantage of constructing the gate contorl circuit 20 as a pulse-switched circuit is that the latter can then easily by syncrhonized with an external clock. For the purpose of synchronisation the current source 7 has a synchronizing input 21 for an external clock signal, which input 21 is connected to the gate control circuit 20 via a divider 22 having an inhibit input 18 which will be described in greater detail hereinafter.

The converter 1 additionally includes a starter circuit 10 connected to the line input 2-1, 2-2, and having a supply voltage output 11. FIG. 2 of said U.S. Pat. No. 4,246,634 shows a possible implementation of the starter circuit 10. The power dissipated therein is however, necessarily high, partly because of the resistors 56 and 58 which withdraw power from the line input 2-1, 2-2, also during operation of the converter 1. Furthermore, the fact that it includes the capacitor 52 renders the converter 1 very bulky, as it must be suitable for a wide range of possible signal values at the line input 2-1, 2-2 and therefore unsuitable for integration on a chip.

In FIG. 2 of the present patent application, these disadvantages are obviated in a simple way. FIG. 2 shows a possible practical example of the starter circuit 10, which includes a first resistor 23 and a second resistor 24, both connected to the line input terminal 2-1 and also an FET 25 by way of first transistor and a second transistor shown as a current source 26, having a control input 27. The base of the first transistor forming the gate of the FET 25 is connected, together with the first resistor 23, to the current source 26, the current source 26 additionally being connected to the line input terminal 2-2; the drain of the FET 25 is connected to the second resistor 24, whilst the source of the FET 25 is connected to the supply voltage output 11. The supply voltage 11 is first connected to a non-inverting input of a differential amplifier circuit 35, whose inverting input constitutes a reference signal input 36. The output of the circuit 35 is connected to the control input 27.

The starter circuit 10 operates as follows: after the d.c. voltage signal has been applied to the line input 2-1, 2-2, that is to say on starting of the converter 1, a differential signal value depending on the amplitude difference between the supply voltage at the output 11 and the reference voltage at the input 36 is applied to the control input 27 via the differential amplifier circuit 35. Using this differential signal a supply volage having an amplitude of, for example, 4.88 Volts is generated on starting of the converter 1 at the output 11. Additionally, a resistor 28 and a zener diode 29 are arranged in series with each other via a reference output 30 and coupled with the supply voltage output 11. Advantageously, at a signal value at the line input 2-1, 2-2 varying from 20 to 96 Volts, the series arrangement of the resistor 28 and the zener diode 29 is connected to a substantially constant supply voltage of approximately 5 Volts, also during the period of time in which the converter 1 is operative. As a result thereof, particularly at a high signal value, the power consumed by this series arrangement is significantly limited, compared with the case in which the series arrangement is directly connected to the line input 2-1, 2-2. In addition, the converter 1 includes a rectifier circuit 12 which, when the converter 1 operates in a mode still further to be described, applies a supply voltage generated by the auxiliary winding 6 to the supply voltage output 11 and is connected to the auxiliary winding 6 of the transformer 3 and to the supply voltage output 11. This supply voltage is higher and has a value of, for example, 5 Volts, than the supply voltage generated by the starter circuit 10 starting the converter 1. The higher supply voltage during operation at the output 11 causes FET 25 to be cut off because of the fact that the reference input at signal 36 remains constant. Thus, during operation the dissipation through the starter circuit 10 is still only determined by the value of the first resistor 23. By giving this resistor 23 a value of the order of 10 MOhm, the power withdrawn from the line input is limited in a simple way.

The converter 1 further includes a control circuit 13 having a detection signal input 14 for keeping constant the maximum value of the sawtooth current through the primary winding 4 in dependence on the current to be determined by the signal at the control input 34 through the primary winding 4 of the transformer 3 by means of the pulse-shaped control signal at input 8. During the mode of operation of the converter 1 thus produced, the sawtooth current is periodically conveyed through the series arrangement of the primary winding 4, the current source 7 and the resistor 9 at instants determined by the external clock signal. The sawtooth current causes the power in the transformer to increase periodically to a maximum value, whereafter this power is coverted into power in the auxiliary winding 6 and the secondary windings 5-1, 5-2.

The problem occurring in the converter 1 is that when a short-circuit is produced in one of the secondary windings 5-1, 5-2, the maximum value of the current through the primary winding 4 is kept constant, causing in that case a significant portion of the power generated in the transformer 3 to be dissipated in the short-circuit. If then this power is withdrawn at the line input 2-1, 2-2, this is not only unwanted and wasteful, but, in addition, it is unsafe, for example as regards the risk of fire in the short-circuit.

In order to obviate these drawbacks a first embodiment of the converter 1 therefore includes inter alia a signalling circuit 15 coupled to the auxiliary winding 6 of the transformer 3. The underlying notion is that in the event of a short-circuit the auxiliary voltage generated in the auxiliary winding 6 increases, this voltage drop is detected by the signalling circuit 15 causing a signalling signal to be generated at the input 16. The signalling circuit 15 may, for example, include a comparator circuit of a type known to a person skilled in the art, but alternatively, for example, a voltage divider. In addition, the converter 1 is provided for that purpose with the control circuit 13 which now however has an additional control input 16 connected to the signalling circuit 15 for reducing by means of the signalling circuit the maximum obtainable value of the current through the primary winding 4 of the transformer 3. By reducing the maximum obtainable value of this current also the short circuiting power is limited in a simple way. In general, signalling an overload of short-circuit must be effected very rapidly, which can be realised by directly connecting the circuit 15, for example in the form of a voltage divider, to the auxiliary winding 6 and to omit any time delay producing elements. Advantageously, in this and subsequent embodiments the electric isolation between the primary winding 4 and the auxiliary winding 6 on the one hand and the secondary windings 5-1, 5-2 on the other hand are preserved. The control circuit 13 includes two comparator circuits 31, 32 whose outputs are each separately connected to an AND-gate circuit 33 which is also included in the circuit 13. The gate circuit 23 is connected to the control input of the current source 7. The non-inverting input of the comparator circuit 31 is connected to the additional control input 16 and the corresponding non-inverting input of the circuit 32 is connected to a reference voltage input 34, whilst the two inverting inputs of the comparator circuits 31, 32 are connected to the detection signal input 14.

The control circuit 13 operates as follows: during operation of the converter 1 the current and consequently the control the voltage across resistor 9 varies in a sawtooth-shaped manner. If the voltage at the detection signal input 14 reaches the reference voltage on input 34, then the output level of the comparator circuit 32 changes and in response thereto the signal at control input 8, which causes the current through the primary winding 4 to be switched off. After a clock signal has been applied to synchronising input 21 this cycle will be repeated, etc. During this mode of operation an auxiliary voltage will be generated in the auxiliary winding 6, causing the first signalling circuit 15 to apply a signalling signal of, for example, a positive amplitude to the additional control input 16. During normal operation, so without the occurence of an overload, this amplitude is higher than the reference voltage at input 34 so that in that case the cycle is performed as described in the foregoing. If now an overload occurs, for example in one of the secondary windings 5-1, 5-2, then the overload causes the amplitude of the auxiliary voltage and consequently the signalling signals, to decrease to below the reference voltage at input 34. When now there is a lower current through the resistor 9 than during normal operation the output level of the comparator circuit 31 changes, as a result of which the control via input 8 of the current source 7 is limited at a lower voltage than before. Thus, in the event of an overload, the power withdrawn by the converter 1 from the line input 2-1, 2-2 is limited in a simple and fast manner.

In a further embodiment of the converter 1, the signalling circuit 15 may be coupled to the auxiliary winding 6 via the broken-line supply circuit 12. Then the signalling circuit 15 is connected directly to the supply voltage output 11. However, the mode of operation of the converter 1, is not basically changed thereby.

In a next embodiment of the converter 1, it comprises a second detector 17 connected to the supply voltage output 11. The detector is connected to the divider 22 via the inhibit input 18. The detector 17 includes, for example a comparator circuit, not shown, for monitoring the voltage at output 11. When said voltage is at a predetermined minimum level an inhibit signal is applied to input 18. The divider 22 is of such a structure that it does not allow the clock signal on the synchronising input 21 to pass and consequently inhibits switching of the current source, as long as the inhibit signal is present across input 18, so as long as the amplitude value of the supply voltage output 11 falls short of a minimum value. This accomplishes that the value of the supply voltage and consequently the value of the voltages derived in the different circuits of the converter 1 from the supply voltage are appropriately defined and are consequently reliable to such an extent that a stable and properly controllable converter 1 is realised.

In addition, the detector 17 contributes during an overload to a reliable limitation of the power withdrawn from the line input 2-1, 2-2 by the converter 1. Namely, should the first lower voltage protection not adequately function in the event of an overload, in such an overload situation switching-off the current source by the inhibit signal at input 18 is prevented by the divider 22, which results in a reliable functioning of the converter 1.

It is an advantage that the converter 1 does not require additional supply means to be connected to the public network. Preferably, the converter 1 is integrated in CMOS, which renders a very low dissipation of the different circuits of the converter 1 possible and the converter 1 can be mass-produced in a compact and cheap manner.

What is claimed is:

1. A d.c. voltage converter having a line input, the converter comprising a transformer having a primary winding, at least one secondary winding and an auxiliary winding, a parallel circuit comprising two branches connected to said line input, one branch including a starter circuit having a supply voltage output and the other branch including a series arrangement which includes at least the primary winding and a pulse-switched current source having a control input, a rectifier circuit connected to the auxiliary winding and connected to the supply voltage output of the starter circuit and a control circuit connected to the control input of the current source and having a detection signal input coupled to the series arrangement for detecting the magnitude of the current flowing through the series arrangement, characterized in that the control circuit has an additional control input coupled to the auxiliary winding for reducing by means of the control circuit the maximum drive of the pulse-switched current source in dependence on the voltage across the auxiliary winding and further characterized in that the converter includes a detector coupled to the supply voltage output of the starter circuit and that the current source has an inhibit signal input connected to the detector for only keeping the current source in the switched-on state by means of a signal to be produced by the detector as long as the amplitude value of the supply voltage on the supply voltage output exceeds a minimal value.

2. A d.c. voltage converter having a line input, the converter comprising a transformer having a primary winding, at least one secondary winding and an auxiliary winding, a parallel circuit comprising two branches connected to said line input, one branch including a starter circuit having a supply voltage output and the other branch including a series arrangement which includes at least the primary winding and a pulse-switched current source having a control input, a rectifier circuit connected to the auxiliary winding and connected to the supply voltage output of the starter circuit and a control circuit connected to the control input of the current source and having a detection signal input coupled to the series arrangement for detecting the magnitude of the current flowing through the series arrangement, characterized in that the control circuit has an additional control input coupled to the auxiliary winding for reducing the means of the control circuit the maximum drive of the pulse-switched current source in dependence on the voltage across the auxiliary winding and further characterized in that the starter circuit includes two parallel-arranged series circuit arrangements a first circuit of which comprises a first resistor and a second transistor having a main current path and a second circuit of which comprises, arranged one after the other, at least a second resistor, a first transistor having a main current path and a third resistor, the base of the first transistor being connected to the junction between the first resistor and the second transistor and the junction of the main current path of the first transistor and the third resistor constituting the supply voltage output, which is coupled to the base of the second transistor for switching the starter circuit off in dependence on the value of the voltage across the auxiliary winding.

3. A d.c. voltage converter as claimed in claim 1 or 2, still further characterized in that the control circuit includes two comparator circuits, each having a signal and an inverse signal input and an output and an AND-gate circuit connected to both outputs, the signal input of the first comparator circuit being connected to the additional control input and the signal input of the second comparator circuit being connected to a reference voltage source, the inverse signal inputs being interconnected and connected to the detection signal input of the control circuit for supplying from the output of the gate circuit a pulse-shaped signal which switches the current source off when the value of the detection signal at the detection signal input is equal to the signal value at one of the signal inputs of the comparator circuit.

* * * * *

UNITED STATES PATENT AND TRADEMARK OFFICE
CERTIFICATE OF CORRECTION

PATENT NO.  :  4,754,386

DATED       :  Jun. 28, 1988

INVENTOR(S) :  Jan De Weerd

It is certified that error appears in the above-identified patent and that said Letters Patent is hereby corrected as shown below:

On the Cover page at [73], "AT&T, Murray Hill, N. J.; Philips Telecommunications B. V., Hilversum, Netherlands" should read --AT&T and Philips Telecommunications B. V., Hilversum, The Netherlands--.

Signed and Sealed this

Twenty-ninth Day of November, 1988

*Attest:*

DONALD J. QUIGG

*Attesting Officer*   *Commissioner of Patents and Trademarks*